US007933633B2

United States Patent
Lin

(10) Patent No.: US 7,933,633 B2
(45) Date of Patent: Apr. 26, 2011

(54) WIRELESS CONTROL APPARATUS FOR WEB PHONES

(75) Inventor: Pi-Fen Lin, Taipei (TW)

(73) Assignee: Sure Best Limited, Apia (WS)

( * ) Notice: Subject to any disclaimer, the term of this patent is extended or adjusted under 35 U.S.C. 154(b) by 658 days.

(21) Appl. No.: 11/790,937

(22) Filed: Apr. 30, 2007

(65) Prior Publication Data
US 2008/0194289 A1 Aug. 14, 2008

(30) Foreign Application Priority Data

Feb. 9, 2007 (TW) ................................ 96104807 A

(51) Int. Cl.
*H04M 1/00* (2006.01)
(52) U.S. Cl. ..................................... 455/569.1; 455/561
(58) Field of Classification Search .................. 455/561, 455/404.1, 569.1; 370/352, 356; 379/218.01, 379/243; 710/13, 313
See application file for complete search history.

(56) References Cited

U.S. PATENT DOCUMENTS

| 7,139,371 | B2 * | 11/2006 | McElvaney | 379/88.17 |
| D603,864 | S * | 11/2009 | Borislow | D14/435.1 |
| 2002/0123368 | A1 * | 9/2002 | Yamadera et al. | 455/556 |
| 2004/0233901 | A1 * | 11/2004 | Sung | 370/356 |
| 2006/0193301 | A1 * | 8/2006 | Cheng et al. | 370/338 |
| 2006/0242715 | A1 * | 10/2006 | Mrazovich | 726/35 |
| 2006/0294262 | A1 * | 12/2006 | Su | 710/13 |
| 2007/0123256 | A1 * | 5/2007 | Whitesell et al. | 455/435.1 |
| 2007/0189270 | A1 * | 8/2007 | Borislow et al. | 370/352 |
| 2007/0189271 | A1 * | 8/2007 | Borislow et al. | 370/352 |
| 2007/0201450 | A1 * | 8/2007 | Borislow et al. | 370/356 |
| 2007/0242771 | A1 * | 10/2007 | Kondo | 375/295 |
| 2008/0247531 | A1 * | 10/2008 | Borislow et al. | 379/218.01 |
| 2008/0294503 | A1 * | 11/2008 | Borislow et al. | 705/10 |
| 2009/0209224 | A1 * | 8/2009 | Borislow et al. | 455/404.1 |

* cited by examiner

*Primary Examiner* — Kent Chang
*Assistant Examiner* — Ronald Eisner
(74) *Attorney, Agent, or Firm* — Bacon & Thomas, PLLC

(57) ABSTRACT

A wireless control apparatus for web phones includes a control base and a Bluetooth controller. The control base carries software for a web phone system. The Bluetooth controller is detachably plugged into the control base. A web device reads the software to perform the web phone system while the control base is plugged into the web device. Moreover, the web device charges the Bluetooth controller via the control base while the Bluetooth controller is plugged into the control base. The Bluetooth controller controls the functions of the web phone system via the control base by wireless transmission while the Bluetooth controller is detached from the control base.

7 Claims, 8 Drawing Sheets

WIRELESS CONTROL APPARATUS FOR WEB PHONES

CROSS-REFERENCES TO RELATED APPLICATIONS

This application claims priority to Taiwan Patent Application No. 096104807 filed on Feb. 9, 2007.

BACKGROUND OF THE INVENTION

1. Field of the Invention

The present invention provides a wireless control apparatus for web phones, especially a control apparatus running software to wirelessly control phone systems through Bluetooth in order to perform the functions of dialing or answering a web phone call, selecting a contact person, and adjusting voice volume.

2. Descriptions of the Related Art

Internet realizes a global platform of barrier-free data transmission. In recent years, communication providers develop this platform as a bridge for remote voice communication. Since the utility rate of web phones hugely increases because of the improvement of voice package transmission technology, current web phone systems, such as SKYPE, are capable of delivering qualified communication performance and also have an advantage of saving connection fees. Accordingly, the web phones become popular.

However, before running a web phone system, an user must download and install a web phone software into his/her personal computer and then choose an account number and password. For those unfamiliar with computer operations, this procedure is complicated and confusing. Furthermore, the web phones require an user to correctly input his/her account number and password so as to activate the services. It is no problem when running the web phone system in his/her own computer because the account number and password can be stored and memorized in the computer. However, it becomes inconvenient when running the web phone system in other's computer or public-access computers if the user forgets his/her account number and password.

In addition, an earphone and a microphone connecting to the computer are necessary to make a phone call through a web phone system. A mouse connecting the computer is also essential to select a contact person and adjust settings.

Therefore, the current web phones have the following defects: 1. the requirement of downloading and installation of a web phone software; 2. inconvenience when other's or a public-access computer is used to run a web phone system if the account number and password cannot be memorized; and 3. the requirement of a computer nearby to plug an earphone, a microphone, and a mouse.

SUMMARY OF THE INVENTION

In view of the above-mentioned defects, the present invention provides a wireless control apparatus for web phones. The wireless control apparatus is capable of controlling a web phone system which will be automatically run after the control apparatus is plugged into a network device. The control apparatus, through Bluetooth, may control the web phone system to perform the functions of dialing or answering a web phone call, selecting a contact person, and adjusting voice volume.

The wireless control apparatus in accordance with the present invention comprises a control base and a Bluetooth controller. The control base may comprise a USB control module, a memory control module, and a first Bluetooth module. The Bluetooth controller is detachably and electrically plugged into the control base. The Bluetooth controller may comprise a second Bluetooth module, a voice I/O module, and a button control module.

If the control base and the Bluetooth controller of the present invention comprise the above elements respectively, the module connections of the control base are: the USB control module being connected to the network device; the memory control module being connected to the USB control module; and the first Bluetooth module being connected to the USB control module. The memory control module, storing web phone software and a personal data, sends the web phone software to the network device through the USB control module. The web phone software is executed by the network device. After the personal data is retrieved and verified, the web phone system can be activated.

If the control base and the Bluetooth controller of the present invention comprise the above elements respectively, the module connections of the Bluetooth controller are: the second Bluetooth module, for data processing, performing wireless data transmission with the first Bluetooth module; the voice I/O module, for providing earphone and microphone functions, being connected to the second Bluetooth module; the button control module being connected to the second Bluetooth module. The button control module has a selection button, a dialing and answering button, and a volume adjustment button to wirelessly control the functions of contact person selection, web phone dialing or answering, and volume adjustment of the web phone system.

The wireless control apparatus of the present invention stores the web phone software and the personal data so that, when it is plugged into the network device, the web phone system is activated if the personal data is verified. Therefore, the present invention can solve the defects of the conventional web phone systems: 1. the requirement of downloading and installation of a web phone software; 2. inconvenience when other's or a public-access computer is used to run a web phone system if the account number and password cannot be memorized.

Meanwhile, the wireless control apparatus of the present invention can wirelessly control the functions of contact person selection, web phone dialing or answering, and volume adjustment of the web phone system. Therefore, the present invention further solves the defect of the conventional web phone systems: 3. the requirement of a computer nearby to plug an earphone, a microphone, and a mouse.

The summary and the following detailed description are exemplary. The purpose is to support the claims. Other objectives and advantages of the present invention will be illustrated in the detail description accompanying with the drawings.

DESCRIPTION OF THE PREFERRED EMBODIMENT

Figure 1:
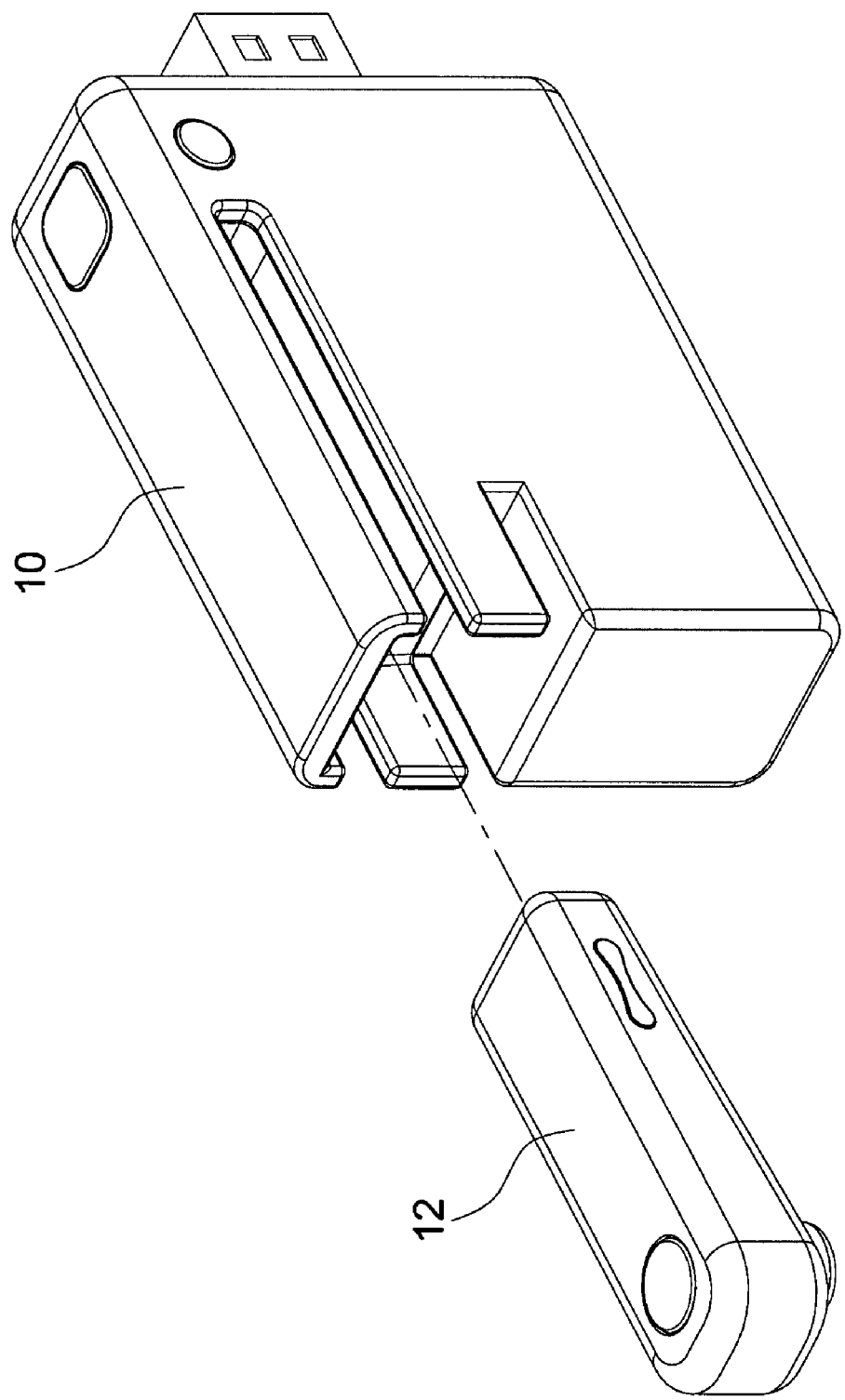
FIG. 1 illustrates the aspect of an embodiment of the present invention.

Referring to FIG. 1, it shows the aspect of an embodiment of the present invention. The embodiment, a wireless control apparatus 1 for web phones, comprises a control base 10 and a Bluetooth controller 12. The Bluetooth controller 12 is detachably and electrically plugged into the control base 10.

Figure 2:
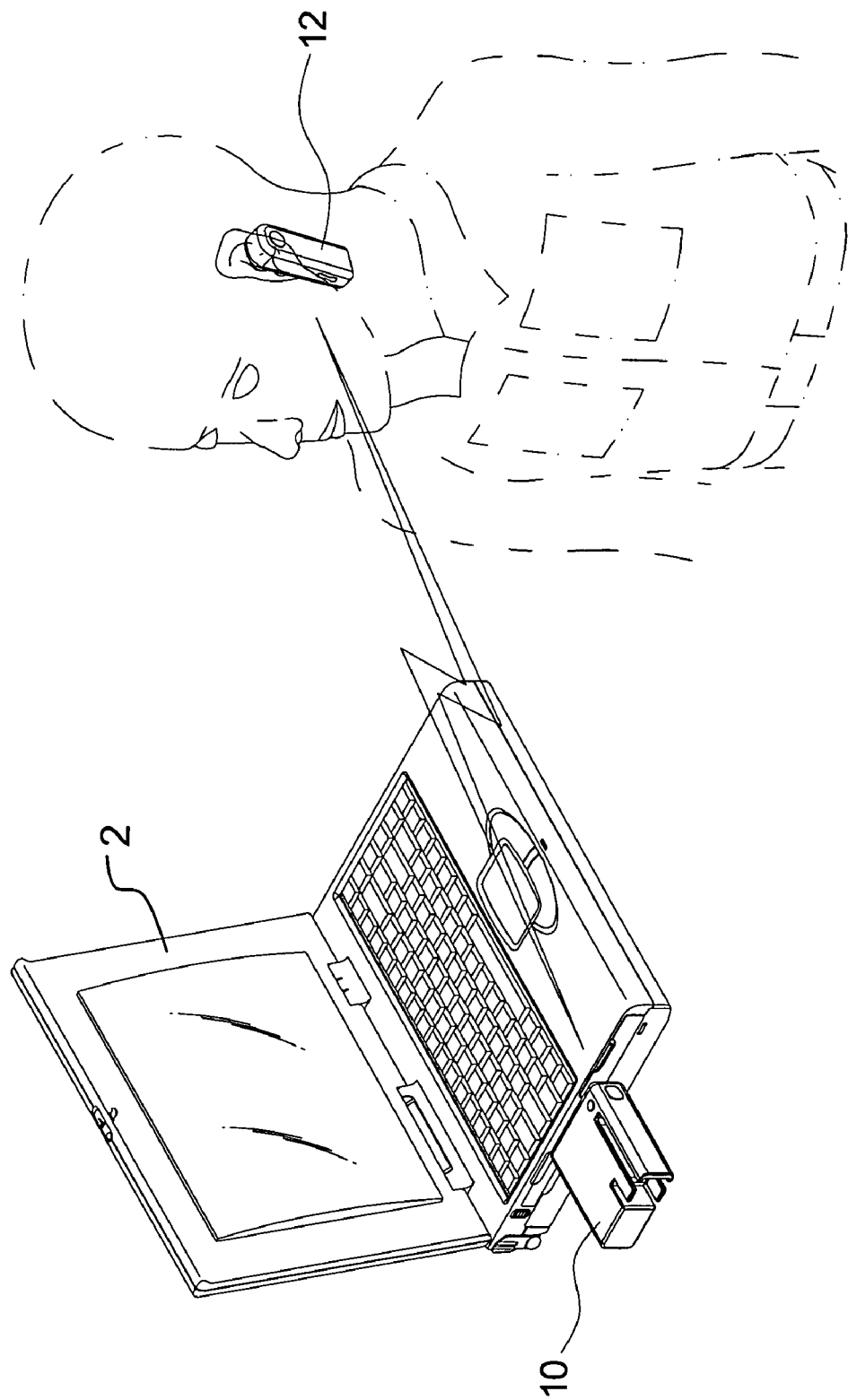
FIG. 2 illustrates usage environment of the embodiment.

Referring to FIG. 2, it shows a usage environment of the embodiment. The wireless control apparatus 1 can be connected to a network device 2 which is a personal computer or a computer installed in a car capable of connecting to Internet. As FIG. 2 shows, the control base 10 can be plugged into the network device 2 in order to perform data transmission with the network device 2. The Bluetooth controller 12 can be electrically plugged into the control base 10 or detached from the control base 10. When the Bluetooth controller 12 is electrically plugged into the control base 10, the network device 2 charges the Bluetooth controller 12 through the control base 10. When the Bluetooth controller 12 is detached from the control base 10, a user may operate the Bluetooth controller 12 to wirelessly control the functions of contact person selection, web phone dialing or answering, and volume adjustment of the web phone system through the control base 10.

Figure 3:
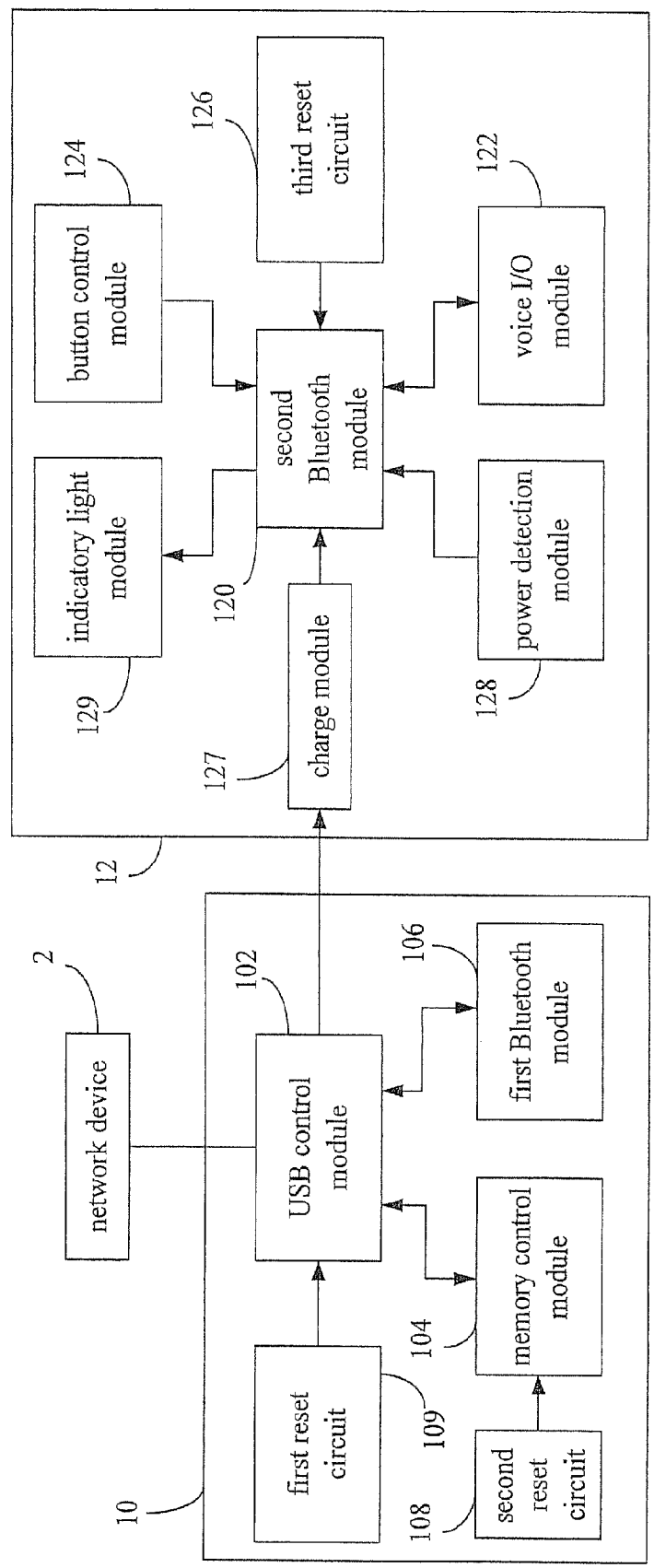
FIG. 3 illustrates a circuit block diagram of the embodiment when a Bluetooth controller is electrically plugged into a control base.

Referring to FIG. 3, it shows a circuit block diagram of the embodiment when the Bluetooth controller 12 is electrically plugged into the control base 10. The control base 10 comprises a USB control module 102, a memory control module 104, a first Bluetooth module 106, a second reset circuit 108, and a first reset circuit 109. The Bluetooth controller 12 comprises a second Bluetooth module 120, a voice I/O module 122, a button control module 124, a third reset circuit 126, a charge module 127, a power detection module 128, and an indicatory light module 129.

Figure 5A:
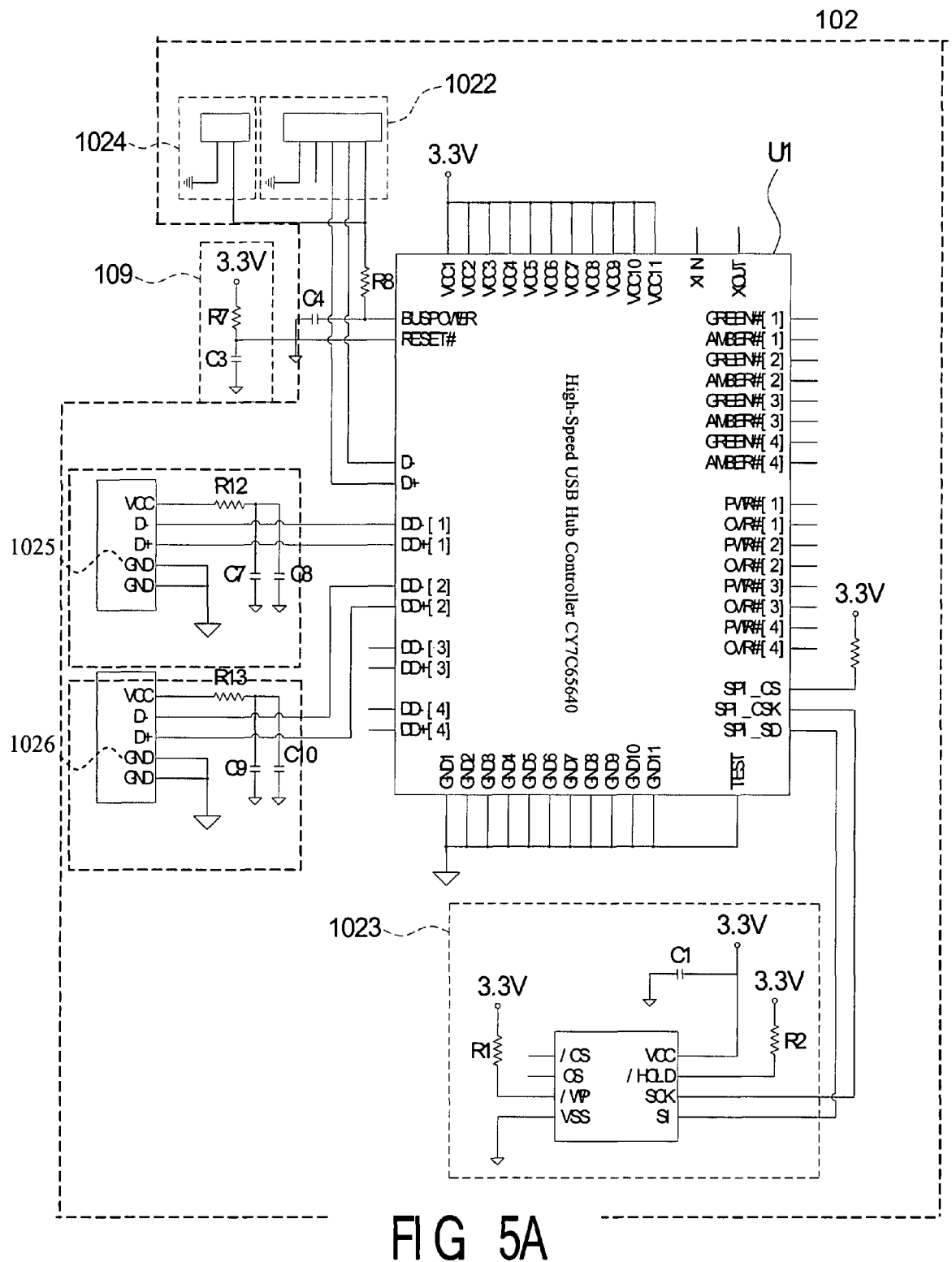
FIGS. 5A-5C illustrate the control base of the embodiment.
Figure 5B:
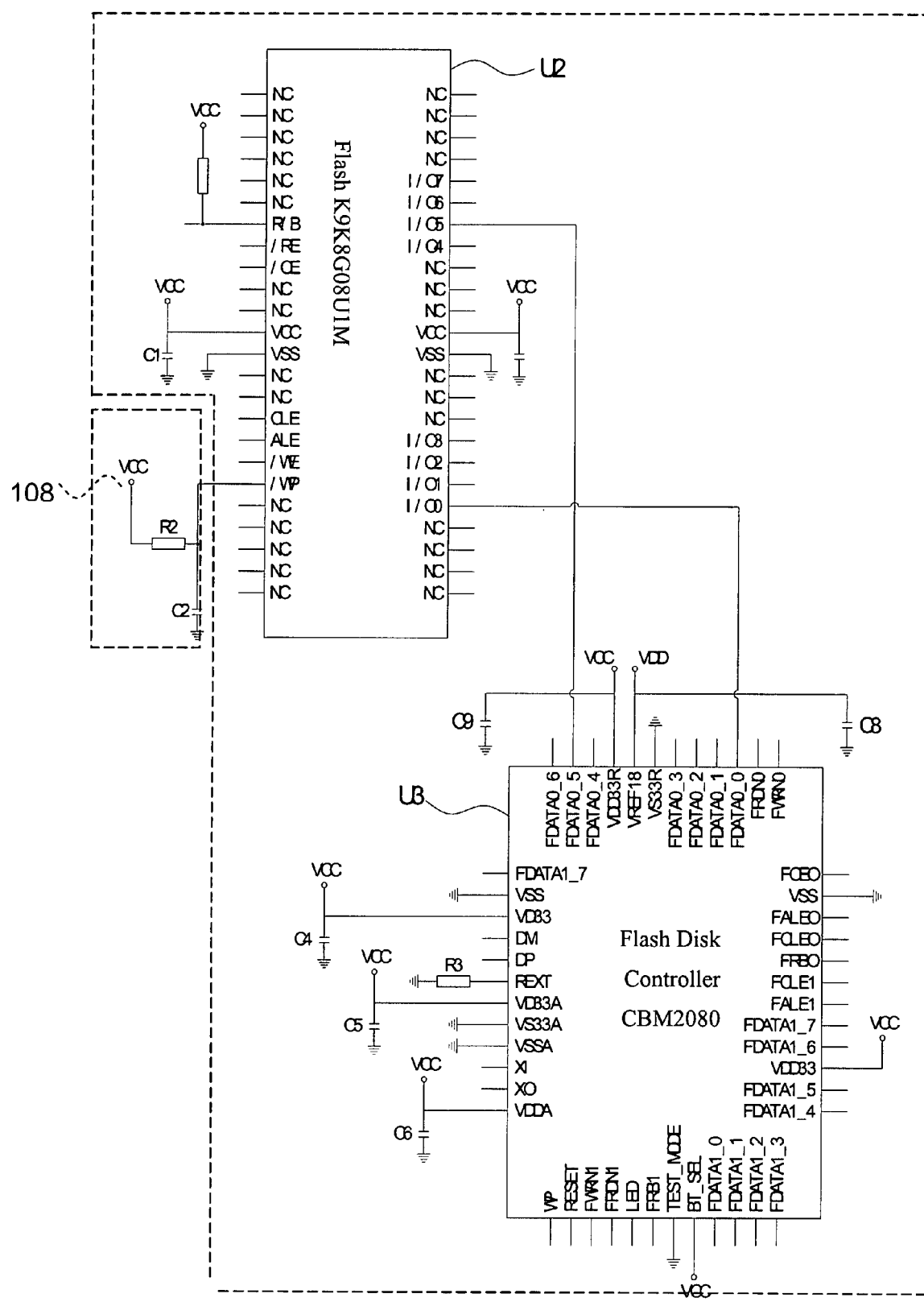
Figure 5C:
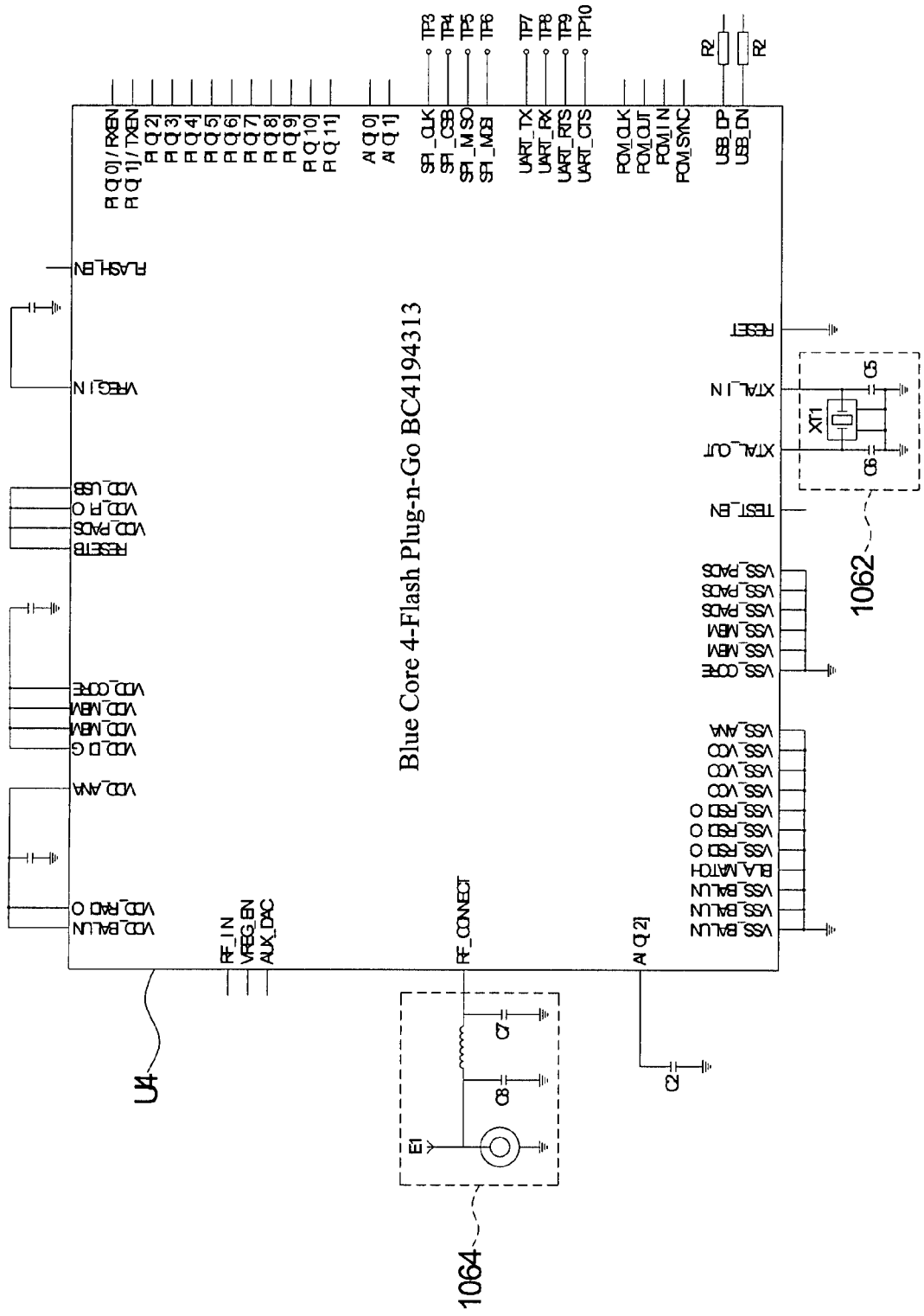

FIGS. 5A-5C illustrate the control base 10. As shown in FIG. 5A, the USB control module 102 comprises a USB control chip U1, a USB connection port 1022, a memory circuit 1023, a charge connection port 1024, a first USB downstream port 1025, and a second USB downstream port 1026. The first and second USB downstream ports 1025, 1026 are configured to transmit signals between the memory control module 104 and the first Bluetooth module 106. The first reset circuit 109 comprises a resistor R7 and a capacitor C3. As FIG. 5B shows, the memory control module 104 comprises a memory control chip U2 and a memory chip U3. As FIG. 5C shows, the first Bluetooth module 106 comprises a control chip U4 connected to an oscillation circuit 1062 and an antenna circuit 1064. The product models of the above-mentioned chips are marked in the drawings.

Referring back to FIG. 3, the control base 10 connects to the network device 2 through the USB control module 102 to perform data transmission with the network device 2, and to obtain power from a power source. The power source can charge the Bluetooth controller 12 when it is connected to the control base 10. The memory control module 104, connected to the USB control module 102, stores software and a personal data for a web phone system. When the control base 10 is plugged into the network device 2, the network device 2 executes the software to run the web phone system. When the control base 10 is detached from the network device 2, the software in the network device 2 is deleted automatically. The software of the embodiment is a SKYPE software, and the personal data of the embodiment is an account number and a password for logging into SKYPE.

The first Bluetooth module 106, connected to the USB control module 102, is configured to perform wireless data transmission with the Bluetooth controller 12. The first reset circuit 109 is connected to the USB control module 102. When the USB control module 102 is plugged into the network device 2, the first reset circuit 109 re-activates the USB control module 102. Meanwhile, the memory control module 104 makes the second reset circuit 108, through a power signal in the circuit 1025 of the USB control module 102, to re-activate the memory module 104.

Figure 6:
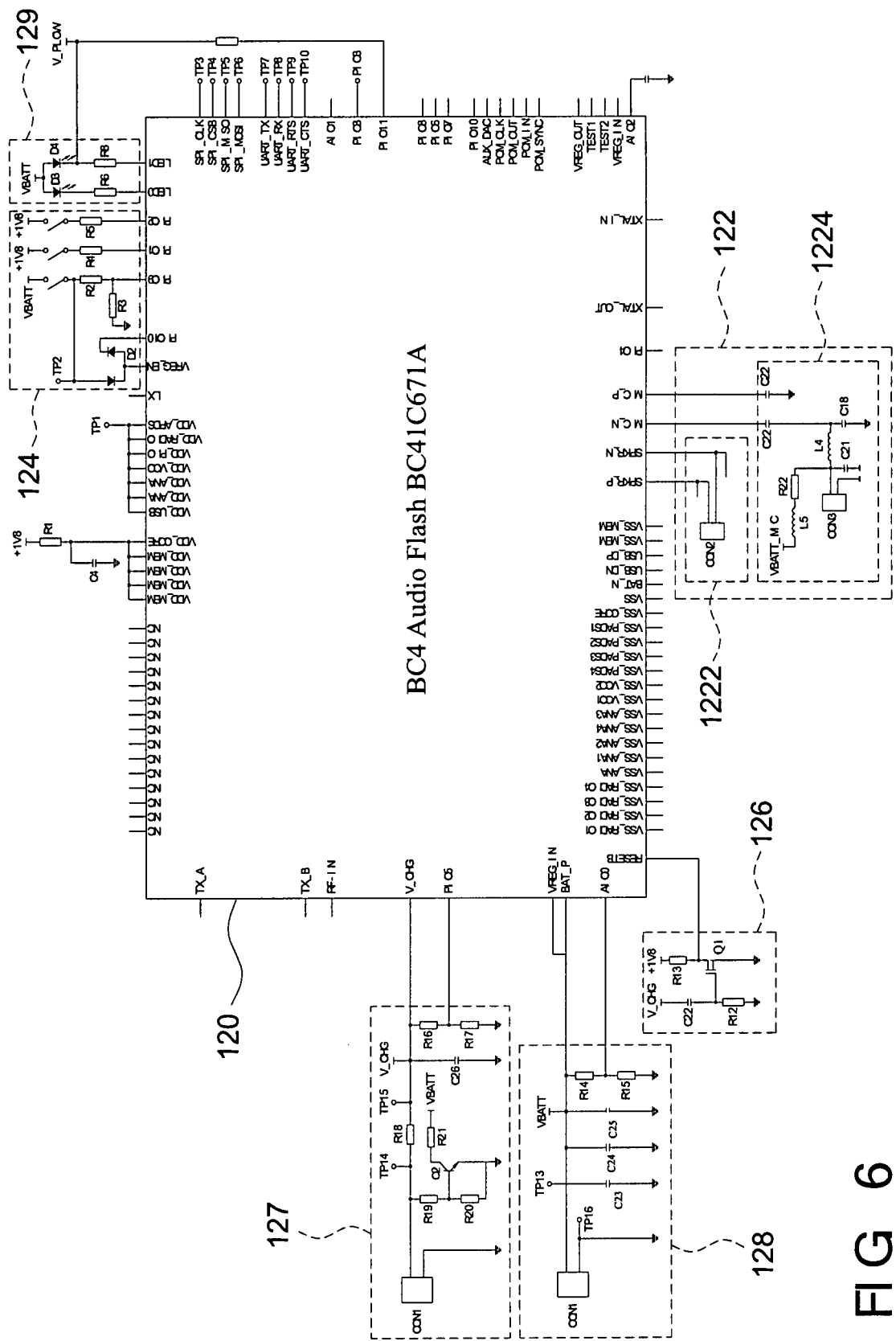
FIG. 6 illustrates the Bluetooth controller of the embodiment.

Referring to FIG. 6, it shows the circuitry of the Bluetooth controller 12. The second Bluetooth module 120 is implemented with a control chip U5. The voice I/O module 122 comprises a speaker control circuit 1222 and a microphone control circuit 1224. The button control module 124 comprises resistors R2-R5, switches SW1-SW3. The third reset circuit 126 comprises resistors R12-R13, a capacitor C22 and an electronic switch Q1. The charge module 127 comprises resistors R16, R17, R19-R21, a capacitor C26, and an electronic switch Q2. The power detection module 128 comprises capacitors C23-C25, and resistors R14-R15. The indicatory light module 129 comprises LEDs D3-D4, and resistors R6, R8.

Referring back to FIG. 3, the Bluetooth controller 12 uses the second Bluetooth module 120 to perform data processing, and perform wireless data transmission with the first Bluetooth module 106. The charge module 127, connected to the USB control module 102 of the control base 10 and the second Bluetooth 120, retrieves power from the USB control module 102 so as to charge the second Bluetooth module 120. The voice I/O module 122, connected to the second Bluetooth module 120, is configured to provide the functions of an earphone and a microphone. The button control module 124 is connected to the second Bluetooth module 120. The switches SW1-SW3 of the button control module 124 are used as a selection button, a dialing and answering button, and a volume adjustment button. The user can wirelessly control the functions of contact person selection, web phone dialing or answering, and volume adjustment of the voice I/O module 122 of the web phone system by pressing these buttons. The third reset circuit 126 is connected to the second Bluetooth module 120. When the second Bluetooth module 120 is charged through the charge module 127, a signal indicative of the charge enables the third reset circuit 126 to output a LOW signal to the second Bluetooth module 120. The second Bluetooth module 120 is re-activated thereby.

The power detection module 128 of the Bluetooth controller 12, connected to the second Bluetooth module 120, is configured to detect a voltage level of a battery in the Bluetooth controller 12. If the voltage level is below a particular voltage, e.g. 3.3V, the power detection module 128 generates a signal indicative of weak power to inform the second Bluetooth module 120. The indicatory light module 129 of the Bluetooth controller 12, connected to the second Bluetooth module 120, provides light indications for functions on the Bluetooth controller 12. For example, the indicatory light module 129 provides a flashing blue light when the wireless control apparatus 1 is ON, and provides a flashing red light when the wireless control apparatus 1 is OFF.

Figure 4:
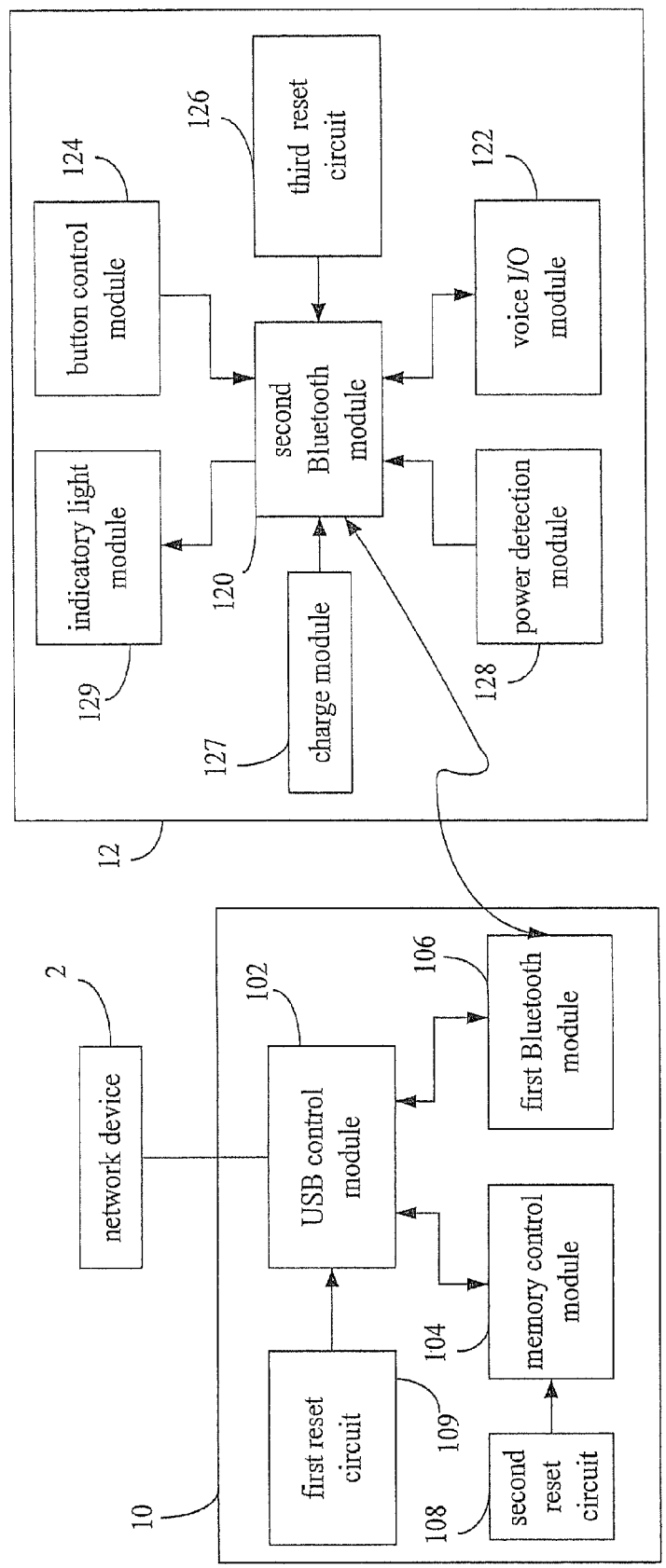
FIG. 4 illustrates a circuit block diagram of the embodiment when the Bluetooth controller is detached from the control base.

FIG. 4 illustrates a circuit block diagram in the condition that the Bluetooth controller 12 is detached from the control base 10. After the Bluetooth controller 12 is detached, the network device 2 stops charging the Bluetooth controller 12 through the control base 10. The user may operate the selection button and/or the dialing and answering button to generate a control instruction. The control instruction is processed by the second Bluetooth module 120 and then transmitted to the first Bluetooth module 106 of the control base 10. Finally, the USB control module 102 controls the functions of contact person selection and web phone dialing or answering of the web phone system in the network device 2. Furthermore, the user may operate the volume adjustment button to generate another control instruction. This control instruction is also processed by the second Bluetooth module 120 to adjust the volume of the earphone and the microphone of the voice I/O module 122.

In conclusion, the wireless control apparatus of the present invention stores the web phone software and the personal data so that, when it is plugged into the network device, the web phone system is executed. Therefore, the present invention can solve the defects of the conventional web phone systems: 1. the requirement of downloading and installation of a web phone software; 2. inconvenience when other's or a public-access computer is used to run a web phone system if the account number and password cannot be memorized.

Besides, the wireless control apparatus of the present invention can wirelessly control the functions of contact person selection, web phone dialing or answering, and volume adjustment of the web phone system. Therefore, the present invention further solves the defect of the conventional web phone systems: 3. the requirement of a computer nearby to plug an earphone, a microphone, and a mouse.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless control apparatus for web phones for controlling a web phone system through a network device, comprising:
    a control base for storing software and a personal data for the web phone system, the software being sent to the network device when the control base is connected to the network device, functions of the web phone system being executed in the network device after the personal data is verified, the control base comprising:
    an accommodation room;
    a USB control module connected to the network device;
    a memory control module connected to the USB control module for storing the software and the personal data, the memory control module configured for sending the software to the network device through the USB control module;
    a first Bluetooth module connected to the USB control module, for communicating with the Bluetooth controller;
    a first reset circuit, connected to the USB control module for re-activating the USB control module; and
    a second reset circuit connected to the memory control module, for re-activating the memory control module; and
    a Bluetooth controller being capable of being plugged into the accommodation room of the control base so as to be stored properly and prevent loss of the Bluetooth controller for carrying or detached from the accommodation room of the control base, wherein when the Bluetooth controller is detached from the control base the functions of the web phone system can be controlled by the Bluetooth controller through wirelessly communicating with the control base, the Bluetooth controller comprising:
    a second Bluetooth module for performing data processing and wireless data transmission with the control base;
    a voice I/O module, connected to the second Bluetooth module, for providing functions of an earphone and a microphone;
    a button control module, connected to the second Bluetooth module, for controlling the functions of the web phone system, wherein the button control module comprises a selection button, a dialing and answering button, and a volume adjustment button to control functions of contact person selection, web phone dialing or answering, and volume adjustment of the voice I/O module of the web phone system
    a charge module for retrieving power through the control base and charging the second Bluetooth module when the Bluetooth controller is electrically connected to the control base and
    a third reset circuit, connected to the second Bluetooth module, for re-activating the second Bluetooth module during charging.

2. The wireless control apparatus of claim 1, wherein the Bluetooth controller further comprises a power detection module, connected to the first Bluetooth module, for informing the first Bluetooth module if power is insufficient.

3. The wireless control apparatus of claim 1, wherein the Bluetooth controller further comprises an indicatory light module, connected to the first Bluetooth module, for providing light indications for functions on the Bluetooth controller.

4. The wireless control apparatus of claim 1, wherein the network device is a personal computer.

5. The wireless control apparatus of claim 1, wherein the network device is a computer installed in a car.

6. The wireless control apparatus of claim 1, wherein the software is SKYPE software.

7. The wireless control apparatus of claim 1, wherein the personal data is an account number and a password for the web phone system.

* * * * *